US005633591A

United States Patent [19]

Childress et al.

[11] Patent Number: 5,633,591

[45] Date of Patent: May 27, 1997

[54] APPARATUS AND METHOD FOR MEASURING THE BREAKDOWN VOLTAGE BETWEEN TWO ELECTRODES SEPARATED BY A DIELECTRIC

[75] Inventors: William E. Childress, Norris; William A. Griffith, Knoxville, both of Tenn.

[73] Assignee: Gas Research Institute, Chicago, Ill.

[21] Appl. No.: 692,505

[22] Filed: Aug. 5, 1996

Related U.S. Application Data

[63] Continuation of Ser. No. 229,695, Apr. 19, 1994, abandoned.

[51] Int. Cl.$^{6}$ .......... F02P 17/00; G01M 15/00

[52] U.S. Cl. .......... 324/399; 73/117.3

[58] Field of Search .......... 324/379, 380, 324/399, 402; 73/116, 117.3

[56] References Cited

U.S. PATENT DOCUMENTS

| | | | |
|---|---|---|---|
| 3,743,922 | 7/1973 | Festos | 324/19 |
| 3,984,768 | 10/1976 | Staples | 324/62 |
| 4,052,665 | 10/1977 | Gruenwald | 324/54 |
| 4,090,130 | 5/1978 | Willenbecher, Jr. | 324/126 |
| 4,156,839 | 5/1979 | Nakagawa | 324/15 |
| 4,558,280 | 12/1985 | Koehl et al. | 324/399 |
| 4,684,896 | 8/1987 | Weishaupt | 324/399 |
| 4,783,991 | 11/1988 | Wixon | 73/117.3 |
| 4,825,167 | 4/1989 | Bayba | 324/399 |
| 4,987,771 | 1/1991 | Iwata | 324/393 |
| 5,226,394 | 7/1993 | Shimasaki et al. | 123/479 |
| 5,237,279 | 8/1993 | Shimasaki et al. | 324/391 |
| 5,269,282 | 12/1993 | Miyata et al. | 123/627 |
| 5,399,972 | 3/1995 | Hnat et al. | 324/399 |

FOREIGN PATENT DOCUMENTS

| | | |
|---|---|---|
| 602200 | 9/1934 | Germany . |
| 1372280 | 7/1972 | United Kingdom . |
| WO9302286 | 2/1993 | WIPO . |

*Primary Examiner*—Walter E. Snow
*Attorney, Agent, or Firm*—Dick and Harris

[57] ABSTRACT

An apparatus and method for measuring a breakdown voltage between two electrodes separated by a dielectric. The output of a sensor perceiving the voltage across the two electrodes is transferred to a peak-hold circuit. A spark through the dielectric and across the two electrodes is detected, Restrikes between the electrodes are clamped by precluding further transfers of sensor output to the peak-hold circuit for a predetermined period of time subsequent to the detected occurrence of the spark.

10 Claims, 5 Drawing Sheets

APPARATUS AND METHOD FOR MEASURING THE BREAKDOWN VOLTAGE BETWEEN TWO ELECTRODES SEPARATED BY A DIELECTRIC

This is a continuation of application Ser. No. 08/229,695, filed Apr. 19, 1994, now hereby abandoned.

BACKGROUND OF THE INVENTION

1. Field of the Invention

The present invention relates in general to voltage measurement, and, more particularly, to an apparatus and method for measuring a breakdown voltage between two electrodes separated by a dielectric, such as the breakdown voltage, or spark voltage, of a sparkplug or the like.

2. Background Art

Internal combustion engines which include sparkplug ignition systems have been in widespread use for quite some time. The ignition systems energize sparkplugs with voltages sufficient to cause a breakdown, or spark, between two electrodes of the sparkplug. This, in turn, ignites an air-fuel mixture within a cylinder of the engine.

It is often desirable to monitor the performance of an engine. One way of monitoring engine performance is to measure the breakdown voltage of associated sparkplugs, i.e., the voltage at which sparks occur. By monitoring breakdown voltages, sparkplug wear may be monitored. In addition, worn or damaged plug wires may be detected, as well as improperly adjusted air gaps between sparkplug electrodes.

Prior art systems for measuring breakdown voltage typically employ a "nonintrusive" sensor, such as a capacitive sensor, proximate to a plug wire connected to one electrode of the sparkplug. One example of a prior art capacitive sensor is Willenbecher, Jr., U.S. Pat. No. 4,090,130. The plug wire typically couples the electrode to an ignition coil within the ignition system. The output of the sensor is transferred to a peak-hold circuit, which, in turn, outputs a voltage indicative of a peak output of the sensor. An example of a prior art system including a capacitive sensor coupled to a peak-hold circuit is Bayba, U.S. Pat. No. 4,825,167.

Often, an additional spark, or restrike, will occur shortly after sparkplug breakdown. Such restrikes are generally caused by residual energy remaining in the ignition coil subsequent to the original spark.

One shortcoming of prior art voltage measurement systems is that they allow sensor output corresponding to restrikes to be transferred to the peak-hold circuit. This may result in an erroneously high voltage measurement, by allowing the output of the sensor corresponding to a restrike to increase charge held within a storage capacitor of the peak-hold circuit.

The present invention overcomes the shortcoming of such prior art systems by providing restrike clamping means for precluding further transfers from a sensor means to a peak-hold means for a predetermined period of time subsequent to the detected occurrence of a spark.

This and other features of the present invention will become apparent in light of the present specification, drawings and claims.

SUMMARY OF THE INVENTION

The present invention comprises an apparatus for measuring a breakdown voltage between two electrodes separated by a dielectric.

The apparatus includes sensor means providing a total output charge substantially indicative of the voltage across the two electrodes for sensing a voltage across the two electrodes. Peak-hold means are operably coupled to the sensor means for storing a charge which is substantially indicative of the total output of the sensor means. The peak-hold means providing an output voltage substantially indicative of the stored charge.

Spark detection means are operably coupled to the sensor means for detecting the occurrence of a spark through the dielectric and across the two electrodes. In addition, restrike clamping means substantially preclude further transfer of charge from the sensor means to the peak-hold means for a predetermined period of time subsequent to the detected occurrence of the spark.

In a preferred embodiment of the invention, the sensor means includes a conductive tube-like member substantially surrounding at least a portion of an insulated conductor operably attached to one of the electrodes. The conductor insulation serves as a dielectric between the tube-like member and the conductor. The tube-like member, conductor insulation, and insulated conductor collectively form a capacitor.

Also in a preferred embodiment, the peak-hold means includes at least one steering diode and at least one storage capacitor. The steering diode provides a current path between the storage capacitor and the sensor means. The peak-hold means further includes discharge means for rapidly discharging the storage capacitor. The storage capacitor may include a first terminal and a second terminal, and the discharge means may include a transistor operably coupling the first terminal and the second terminal to a ground potential whenever the transistor is turned on.

Moreover, the spark detection means may also include a steering diode operably coupled to the sensor means and a zener clamp diode operably coupled to the steering diode. Furthermore, the restrike clamping means includes at least one steering diode operably coupled to the sensor means. The steering diode is activated by the spark detection means, and substantially precludes further transfer of charge from the sensor to the peak-hold means.

In a preferred embodiment of the invention, the apparatus further includes an analog-to-digital converter operably coupled to the peak-hold means, converting the output voltage of the peak-hold means to a digital value substantially indicative of the output voltage.

The preferred embodiment of the invention further includes a process for measuring the breakdown voltage between two electrodes separated by a dielectric. The process comprises the steps of: (a) sensing a voltage across the two electrodes; (b) outputting a charge substantially indicative of the voltage across the two electrodes; (c) transferring the charge to a storage capacitor; (d) storing within the storage capacitor a charge substantially indicative of a peak voltage across the two electrodes; (e) detecting the occurrence of a spark through the dielectric and across the two electrodes; and (f) precluding further transfers of charge to the storage capacitor for a pre-determined period of time subsequent to detecting the occurrence of a spark.

The process may further include the step of converting the charge stored within the capacitor to a digital value substantially indicative of the stored charge.

DETAILED DESCRIPTION OF THE DRAWINGS

Figure 2:
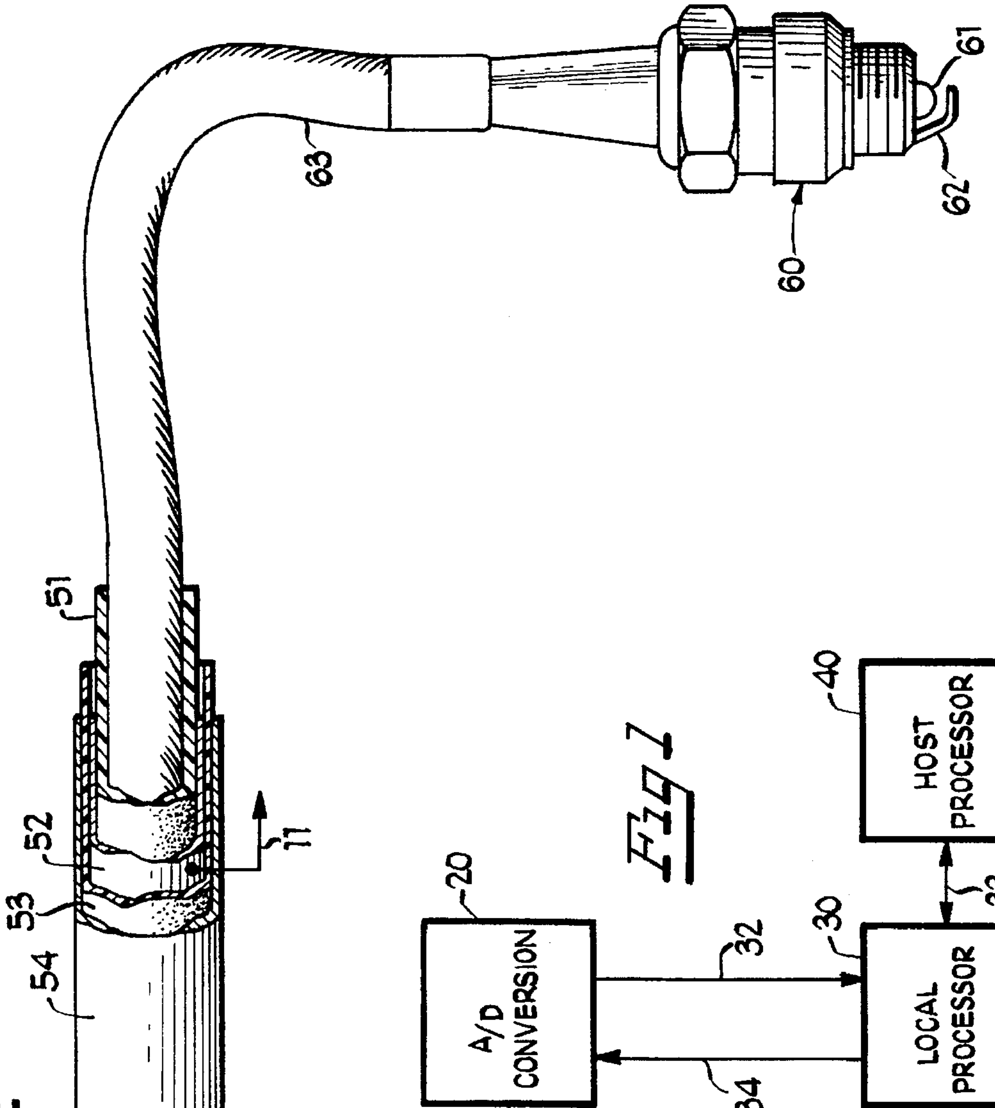
FIG. 2 of the drawings is a diagram of a system incorporating the present apparatus.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

Figure 1:
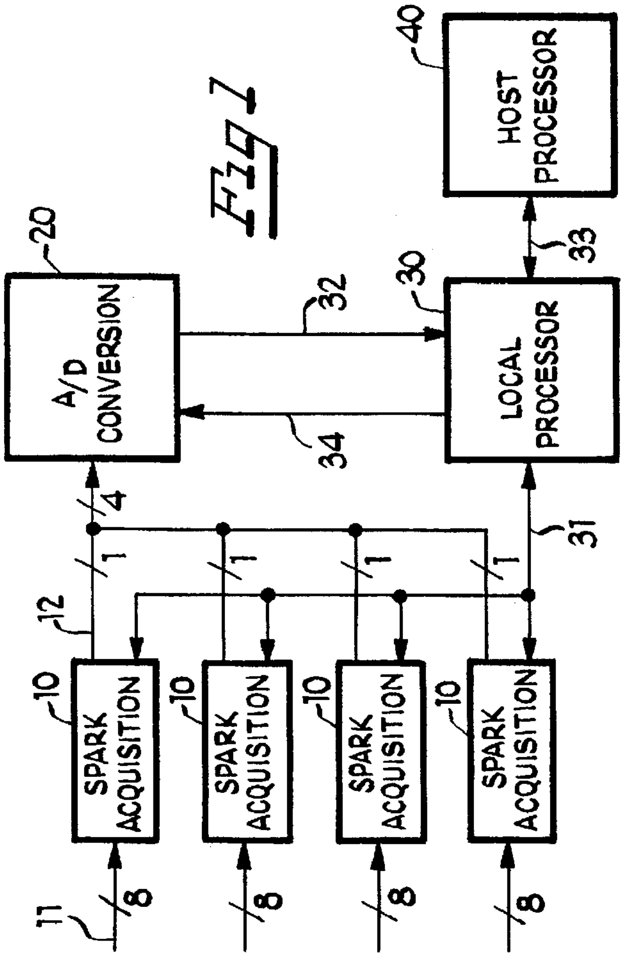
FIG. 1 of the drawings is a partial cross-sectional view of the sensor means.

The present invention is shown in FIG. 1 and FIG. 2 as comprising sensor means 50, a plurality of spark acquisition circuitry 10, analog-to-digital converter 20, local processor 30 and host processor 50. Sensor means 50 senses the voltage within an associated plug wire, and outputs over time a total charge substantially indicative of the sensed voltage to a spark acquisition circuitry 10. A conductor 11 couples sensor means 50 to spark acquisition circuitry 10.

Referring to FIG. 1, spark acquisition circuitry 10 detects the occurrence of sparks within a plurality of sparkplugs coupled to associated plug wires. An indication of a spark occurrence is relayed to local processor 30 via control lines 31. Upon detection of the spark, a voltage 12, which is substantially indicative of the breakdown voltage of the spark, is output from spark acquisition circuitry 10, to conventional analog-to-digital converter 20, which converts voltage 12 to a digital representation. Data lines 32 transfer this digital representation to local processor 30.

Local processor 30, which may comprise a Motorola MC68HC11 microcontroller, controls multiplexers, via control lines 31 and 34, associated with spark acquisition circuitry 10 and analog-to-digital converter 20. These multiplexers determine which sparkplug breakdown voltage is to be sampled by analog-to-digital converter 20.

Local processor 30 communicates with host processor 40 via a conventional interface, such as an RS485 interface. Host processor 40 may comprise a personal computer, such as an IBM PC-compatible computer. Host processor 40 issues commands to local processor 30, such as commands to measure the output of a particular sensor means, and commands to transmit digital representations of measurements back to the host processor.

Host processor 40 also performs subsequent processing of the digital representations of the sparkplug breakdown voltages. In particular, host processor 40 logs measured voltages to a hard disk drive, and may subsequently plot or perform trend or other analysis upon the logged data.

Sensor means 50, shown in detail in FIG. 2, is employed to measure the voltage within an associated conductor; plug wire 63. Plug wire 63 couples a first electrode 61 of sparkplug 60 to an ignition system. A second electrode 62 of sparkplug 60 remains at a ground potential—the potential of an associated engine block. Accordingly, the voltage of plug wire 63 is substantially the same as the voltage between electrodes 61 and 62.

Sensor means 50, as shown in FIG. 2, comprises an inner insulator 51, an inner brass tube 52, an outer insulator 53, and an outer brass tube 54. Inner insulator 51 insulates plug wire 63, and serves as a dielectric between inner plug wire 63 and brass tube 52. A relatively small capacitive coupling of approximately 5 to 10 picofarads are formed between inner brass tube 52 and plug wire 63. Outer insulator 53 isolates inner brass tube 52 from outer brass tube 54. Outer brass tube 54, which is coupled to system ground, serves as a shield. Although sensor means may include brass tubing, other configurations are also contemplated—with the desired result being a relatively small capacitive coupling provided with respect to plug wire 63.

Conductor 11 couples sensor means 50 to spark acquisition circuitry 10. In a preferred embodiment, conductor 11 comprises a coaxial cable, with the central conductor of the coaxial cable connected to inner brass tube 52 and the outer shield of the coaxial cable connected to outer brass tube 54.

Figure 3:
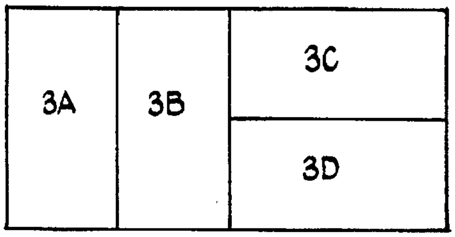
FIG. 3 of the drawings is an overview showing the interconnection of FIGS. 3A, 3B, 3C and 3D.
Figure 3A:
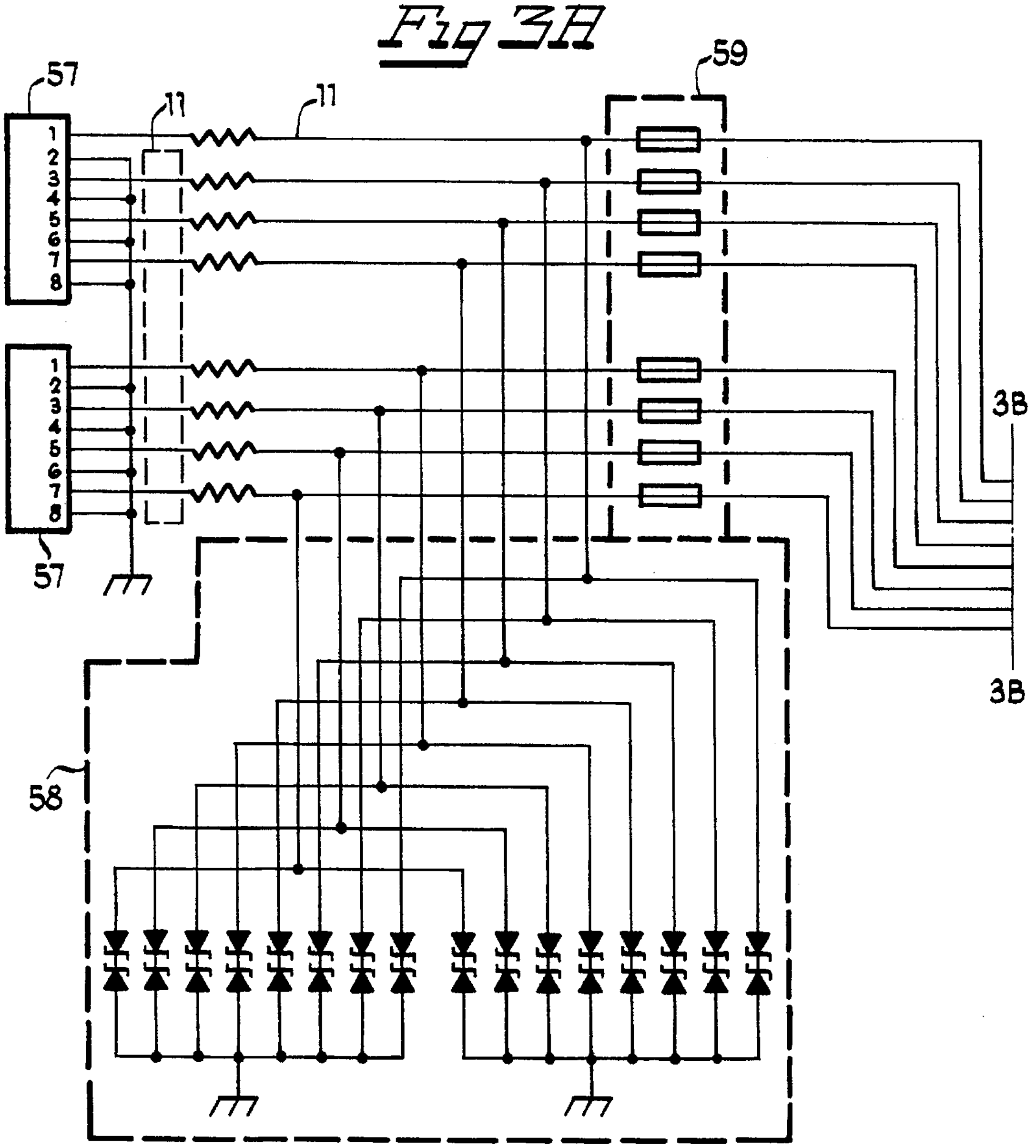
FIG. 3A of the drawings is a schematic diagram of a portion of the spark acquisition circuitry, including connections to FIG. 3B along lines 3B—3B.
Figure 3B:
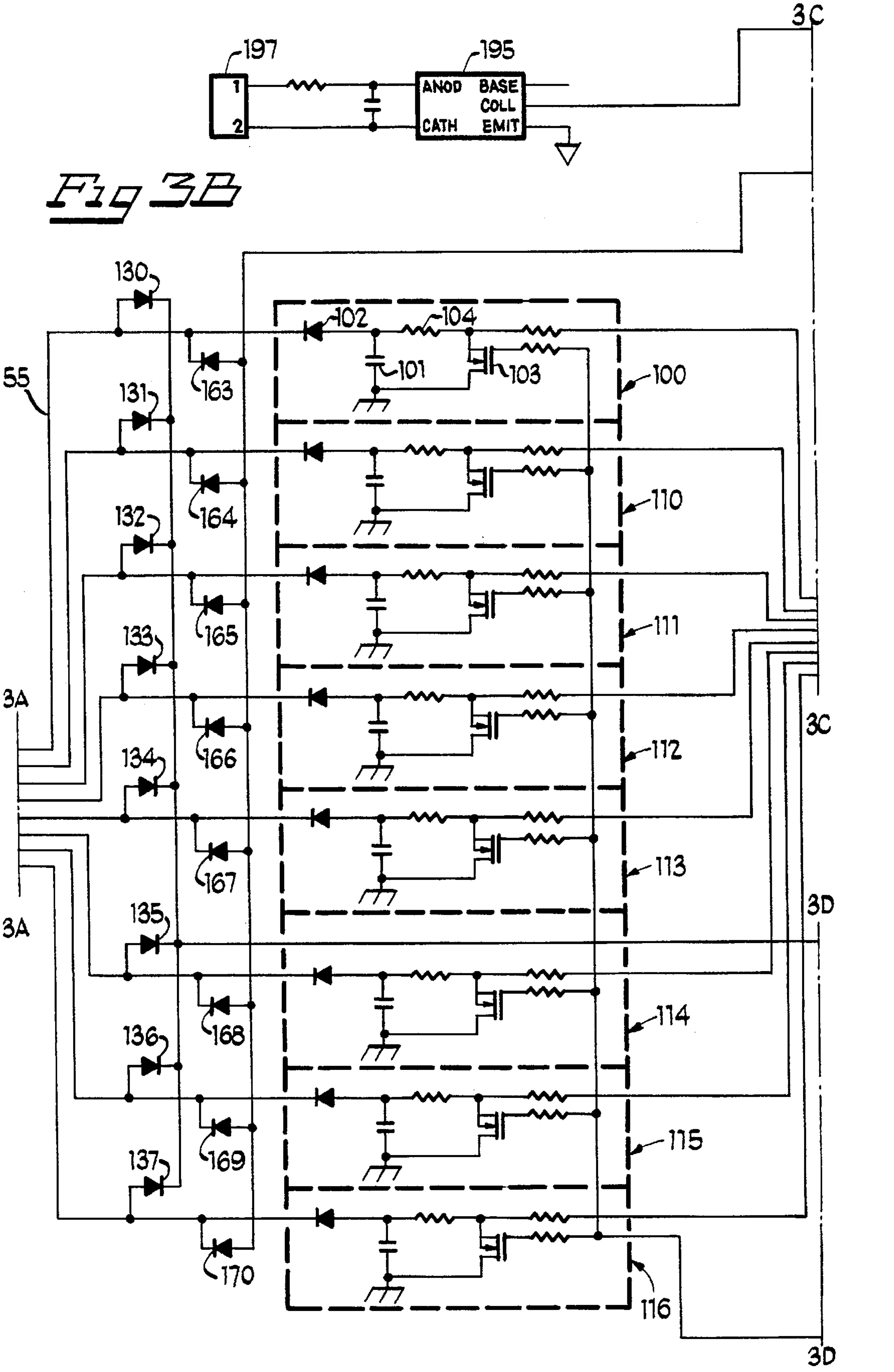
FIG. 3B of the drawings is a schematic diagram of another portion of the spark acquisition circuitry, including connections to FIG. 3A along lines 3A—3A, connections to FIG. 3C along lines 3C—3C, and connections to FIG. 3D along lines 3D—3D.
Figure 3C:
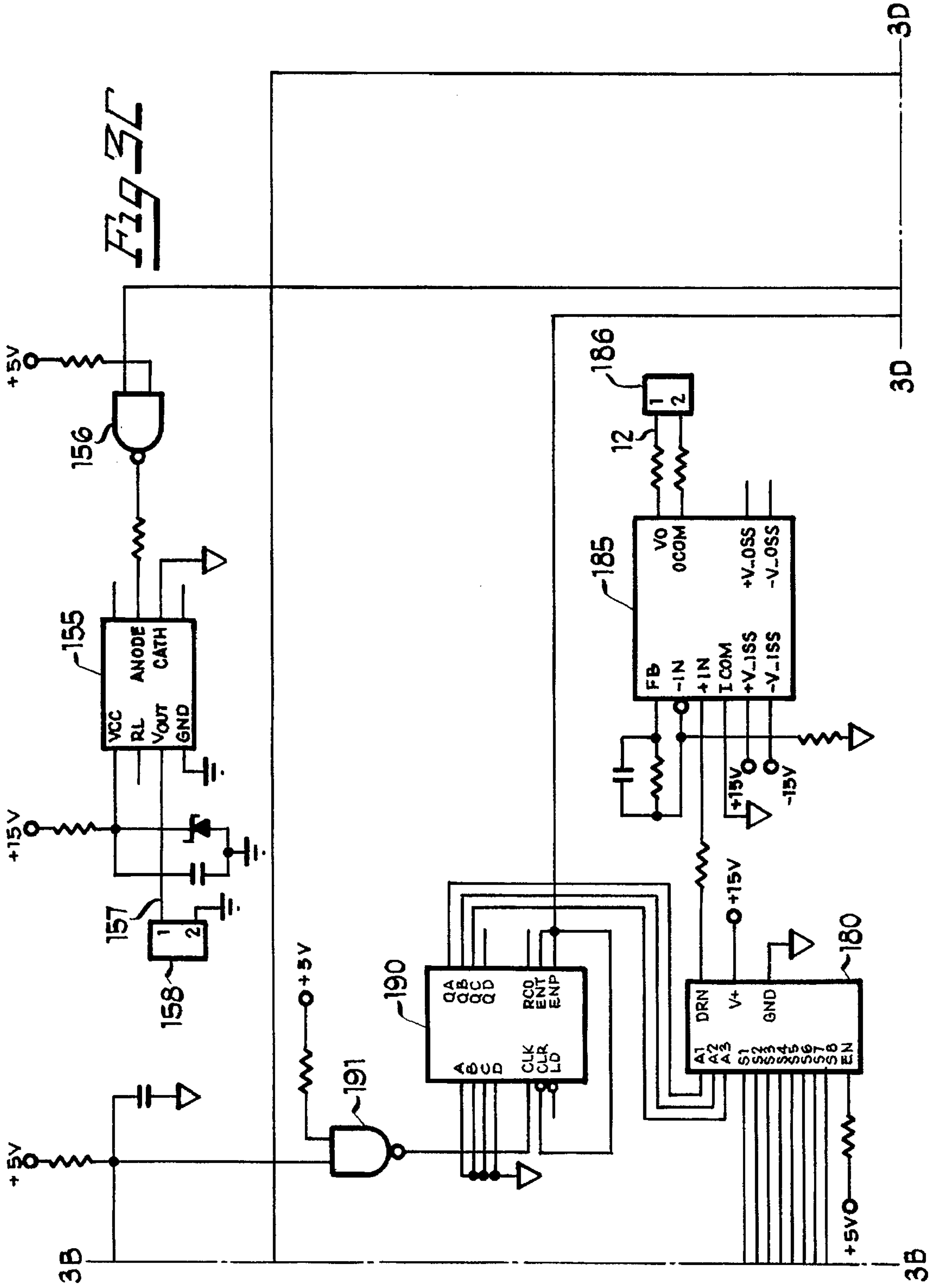
FIG. 3C of the drawings is a schematic diagram of yet another portion of the spark acquisition circuitry, including connections to FIG. 3B along lines 3B—3B, and connections to FIG. 3D along lines 3D—3D.
Figure 3D:
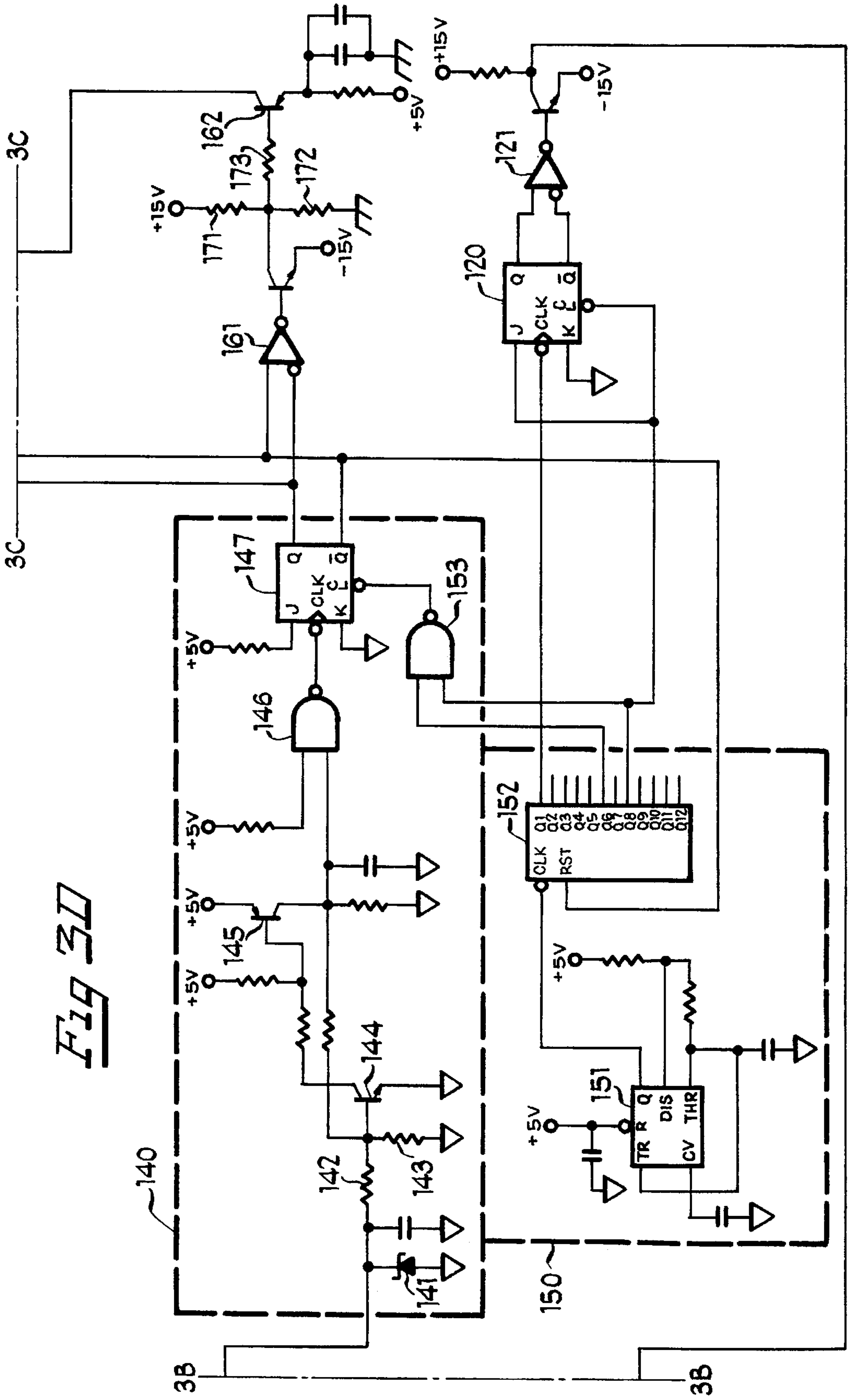
FIG. 3D of the drawings is a schematic diagram of still another portion of the spark acquisition circuitry, including connections to FIG. 3B along lines 3B—3B, and connections to FIG. 3C along lines 3C—3C.

A schematic of spark acquisition circuitry 10 is shown in FIG. 3A through FIG. 3D as comprising a plurality of peak-hold means 100 through 116 (FIG. 3B); spark detection means 140 (FIG. 3D), including spark detection steering diodes 130 through 137; restrike clamp means, including comparator 161, transistor 162 (FIG. 3D) and restrike clamp steering diodes 163 through 170 (FIG. 3B); pulse extender 150 (FIG. 3D); analog multiplexer 180; counter 190; isolation amplifier 185; and optocouplers 155 (FIG. 3C) and 195 (FIG. 3B). Fuses 59, and a conventional barrier arrangement of zener diodes 58 (FIG. 3A), are included for safety considerations.

Each spark acquisition circuitry 10 is coupled to as many as eight sensor means 50 via connectors 57. Each sensor means 50, via an associated conductor 11, is coupled to a corresponding fuse 59, spark detection steering diode, peak-hold means, and restrike clamp steering diode. Inasmuch as the components and operation of each spark detection steering diode, peak-hold means, and restrike clamp steering diode is substantially similar for each of the corresponding sensor means, only one group of these components, corresponding to a single sensor means, will be described in further detail.

Referring to FIG. 2, an ignition system energizes electrode 61 of sparkplug 60 by providing a negative-going voltage (with reference to system ground) within plug wire 63. As the voltage within plug wire 63 ramps down, a charge indicative of the voltage within plug wire 63 (and, in turn, of the voltage across electrodes 61 and 62) is induced within sensor means 50. At this time, peak-hold steering diode 102 (FIG. 3B) within peak-hold means 100 is forward-biased, and charge is transferred from sensor means 50 to storage capacitor 101 of peak-hold means 100.

This transfer of charge, and the ramp-down of voltage within plug wire 63, continues until the sparkplug's breakdown voltage is reached, when a spark, or gap conduction, occurs across the air-gap dielectric separating electrodes 61 and 62. At this time, the voltage within plug wire 63 becomes positive-going, rising rapidly towards ground potential. Peak-hold steering diode 102 becomes reversebiased, and charge is no longer transferred from sensor means 50 to storage capacitor 101. Accordingly, storage capacitor 101 now stores a charge which is substantially indicative of the total output of charge from the sensor means during ramp-down of electrode voltage, and which is indicative of the breakdown voltage between electrodes 61 and 62.

Also at this time, spark detection steering diode 130 (FIG. 3B) becomes forward-biased, steering the positive charge from sensor means 50 to zener clamp diode 141 (FIG. 3D) of spark detection means 140. Zener clamp diode 141 turns on with a cathode voltage of approximately 5 volts, providing a path to ground for the positive-going energy. The voltage at the cathode of zener clamp diode 141 provides forward bias, through a divider comprising resistors 142 and 143, to the base of transistor 144, turning transistor 144 on, and, in turn, triggering J-K flip-flop 147 via Schmitt-trigger NAND gate 146, which is configured as an inverter. Transistor 145 provides hysteresis for the output of transistor 144, towards reducing false-triggering of J-K flip-flop 147. In this manner, J-K flip-flop 147 is set whenever a spark is detected from any one of the eight sensor means associated with the present spark acquisition circuitry 10.

Whenever a spark is detected, as indicated by the outputs of J-K flip-flop 147, restrike clamping means are employed to clamp any subsequent restrikes of the spark plug electrodes to a potential somewhat above system ground, precluding further transfers of charge from sensor means 50 to storage capacitor 101 for a predetermined period of time subsequent to the detection of the spark. Whenever J-K flip-flop 147 is set, the output of comparator 161 changes state, turning on transistor 162 through a level shifter comprising resistors 171, 172 and 173. The collector of transistor 162 is connected to restrike clamp diode 163 (FIG. 3B), which provides a clamp of the input from the sensor means, precluding the transfer of further charge from sensor means 50 to peak-hold means 100 during any subsequent restrikes of the associated sparkplug 60.

Although transistor 162 is shown as comprising a PNP bipolar transistor, other configurations are contemplated. Indeed, it may be preferable to substitute a P-channel mosfet transistor, which exhibits a channel resistance based upon input voltage rather than current.

Signal 157 (FIG. 3C), indicating the detected occurrence of a spark, is presented to local processor 30 via connector 158. The inverted output of J-K flip-flop 147 is re-inverted by Schmitt-trigger NAND gate 156, configured as an inverter. The output of NAND gate 156 is connected to signal line 157 through optocoupler 155. The use of an optocoupler allows the power supply and ground of spark acquisition circuit 10 to remain electrically isolated from local processor 30, precluding the injection of unwanted noise into the circuitry of local processor 30.

While J-K flip-flop 147 is set, counter 190 (FIG. 3C) is released from reset and enabled. The three least-significant bits of the Q outputs of counter 190 are connected to the address inputs of analog multiplexer 180. Accordingly, the present value of these Q outputs selects which of the eight inputs to analog multiplexer 180 are to be output to isolation amplifier 185. These eight inputs to analog multiplexer 180, corresponding to the eight outputs of the eight peak-hold means 100 through 116, are voltages which are substantially indicative of the charge stored within the storage capacitors. A control signal received from local processor 30, via connector 197 (FIG. 3B), is employed to clock counter 190, and, in turn, to sequence through the eight inputs to analog multiplexer 180. Accordingly, local processor 30 selects which peak-hold means output is to be sampled by analog-to-digital converter 20 (FIG. 1). This control signal is connected to the clock input of counter 190 via optocoupler 195 and Schmitt-trigger NAND gate 191, configured as an inverter. The use of an optocoupler allows the power supply and ground of spark acquisition circuit 10 to remain electrically isolated from local processor 30, precluding the injection of unwanted noise into the circuitry of local processor 30.

To complete the measurement of breakdown voltage, the output of analog multiplexer 180 is connected to analog-to-digital converter 20 (FIG. 1) via isolation amplifier 185 (FIG. 3C) and connector 186. Isolation amplifier 185 provides gain to the output of analog multiplexer 180, and further serves to electrically isolate the power supply and ground of spark acquisition circuitry 10 and analog-to-digital converter 20, precluding the injection of unwanted noise into the circuitry of local processor 30.

Also while J-K flip-flop 147 is set, counter 152 within pulse extender 150 (FIG. 3D) is released from reset condition and allowed to count upwards. Timer 151 is configured to provide a continuously oscillating clock signal to the clock input of counter 152. In a preferred embodiment, the frequency of this clock signal is approximately 20 kHz. The Q1 output of counter 152 is connected to the clock input of J-K flip-flop 120, dividing by two the clock input to counter 152. The Q8 output of counter 152 is connected to the clear and J inputs of J-K flip-flop 120. When the Q8 output becomes set (i.e., the Q outputs of counter 152 collectively reach a value of 128, approximately 6 milliseconds after detection of a spark), J-K flip-flop 120 is released from reset. On the next rising edge of its clock input, J-K flip-flop 120 is set. As a result, the output of level shifting comparator 121 changes state, turning on mosfet transistor 103 (FIG. 3B) within peak-hold circuit means 100. When transistor 103 is turned on, both sides of storage capacitor 101 are shorted together and to ground, through resistor 104. As a result, storage capacitor 101 is rapidly discharged, towards being made ready to store a charge substantially indicative of the next total output of the associated sensor means 50.

When the Q outputs of counter 152 reach a value of 160 (i.e., both Q6 and Q8 outputs are high, approximately 8 milliseconds after the detection of a spark), J-K flip-flop 147 is cleared, via Schmitt-trigger NAND gate 153. As a result, counters 152 and 190, and J-K flip-flop 120, are all held in a reset state. Transistor 103 is turned off, allowing storage capacitor 101 to again acquire charge. Transistor 162 is turned off, and restrike clamp steering diode 163 no longer clamps charge from the sensor means. Rather, charge will again be allowed to be transferred from sensor means 50 to storage capacitor 101. Accordingly, approximately 8 milliseconds after the detection of a spark, the predetermined period of time for which transfers of charge from sensor means 50 to peak-hold means 100 are precluded expires.

It should be noted that although circuitry has been disclosed for use in association with an ignition system having negative-going electrode voltage prior to gap conduction, this circuitry is easily modifiable for use in association with an ignition system having a positive-going electrode voltage.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. An apparatus for measuring a breakdown voltage between two electrodes separated by a dielectric, the apparatus comprising:

sensor means for sensing a voltage across the two electrodes, the sensor means providing an output charge substantially indicative of the voltage across the two electrodes;

peak-hold means operably coupled to the sensor means for storing a charge substantially indicative of a total of the output charge provided by the sensor means prior to reaching the breakdown voltage between the two electrodes, the peak-hold means providing an output voltage substantially indicative of the stored charge as an output of the apparatus;

spark detection means operably coupled to the sensor means for detecting the occurrence of a spark through the dielectric and across the two electrodes; and restrike clamping means for substantially precluding further transfer of charge from the sensor means to the peak-hold means for a pre-determined period of time subsequent to and in response to the detected occurrence of the spark.

2. The invention according to claim 1 wherein the sensor means includes a conductive tube-like member substantially surrounding at least a portion of an insulated conductor operably attached to one of the electrodes:

the conductor insulation serving as a dielectric between the tube-like member and the conductor, the tube-like member, conductor insulation and insulated conductor collectively forming a capacitor.

3. The invention according to claim 1 wherein the peak-hold means includes at least one steering diode and at least one storage capacitor, the steering diode providing a current path between the storage capacitor and the sensor means.

4.The invention according to claim 3 wherein the peak-hold means further includes discharge means for rapidly discharging the storage capacitor.

5. The invention according to claim 4 wherein:

the storage capacitor includes a first terminal and a second terminal, the discharge means includes a transistor operably coupling the first terminal and the second terminal to a ground potential whenever the transistor is turned on.

6. The invention according to claim 1 wherein the spark detection means includes a steering diode operatively coupled to the sensor means and a zener clamp diode operably coupled to the steering diode.

7. The invention according to claim 1 wherein:

the restrike clamping means includes at least one steering diode operably coupled to the sensor means, the steering diode being activated by the spark detection means, the steering diode substantially precluding further transfer of current from the sensor means to the peak-hold means.

8. The invention according to claim 1 wherein the apparatus further includes an analog-to-digital converter operably coupled to the peak-hold means, the analog-to-digital converter converting the output voltage of the peak-hold means to a digital value substantially indicative of the output voltage.

9. A process for measuring a breakdown voltage between two electrodes separated by a dielectric, the process comprising the steps of:

sensing a voltage across the two electrodes;

outputting a charge substantially indicative of the voltage across the two electrodes;

transferring the charge to a storage capacitor until reaching the breakdown voltage between the two electrodes;

storing within the storage capacitor [a]the charge substantially indicative of a peak voltage across the two electrodes;

detecting the occurrence of a spark through the dielectric and across the two electrodes; and precluding further transfers of charge to the storage capacitor for a pre-determined period of time subsequent to and in response to detecting the occurrence of a spark.

10. The invention according to claim 9 wherein the process further includes the step of converting the charge stored within the capacitor to a digital value substantially indicative of the stored charge.

* * * * *